(12) United States Patent
Andrus

(10) Patent No.: US 10,202,994 B2
(45) Date of Patent: Feb. 12, 2019

(54) RETENTION CLIP FOR SECURING INSTRUMENTS OF DIFFERENT SIZES AND/OR CONFIGURATIONS TO OTHER OBJECTS

(71) Applicant: Innovation Catalyst Group LLC, Lehi, UT (US)

(72) Inventor: David Andrus, Lehi, UT (US)

(73) Assignee: Innovation Catalyst Group LLC, Mapleton, UT (US)

( * ) Notice: Subject to any disclaimer, the term of this patent is extended or adjusted under 35 U.S.C. 154(b) by 0 days.

(21) Appl. No.: 15/174,458

(22) Filed: Jun. 6, 2016

(65) Prior Publication Data

US 2017/0350431 A1  Dec. 7, 2017

(51) Int. Cl.
| F16B 2/22 | (2006.01) |
| F16B 1/00 | (2006.01) |
| A45F 5/00 | (2006.01) |
| F16B 11/00 | (2006.01) |
| A45F 5/02 | (2006.01) |

(52) U.S. Cl.
CPC .................. *F16B 2/22* (2013.01); *A45F 5/00* (2013.01); *A45F 5/02* (2013.01); *F16B 11/006* (2013.01); *A45F 2200/05* (2013.01); *A45F 2200/0558* (2013.01); *A45F 2200/0566* (2013.01); *A45F 2200/0575* (2013.01); *F16B 2001/0028* (2013.01); *F16B 2001/0035* (2013.01)

(58) Field of Classification Search
CPC .................. F16B 2/22; F16B 1/00; A45F 5/00
See application file for complete search history.

(56) References Cited

U.S. PATENT DOCUMENTS

| 3,521,332 | A | * | 7/1970 | Kramer | F16B 2/22 248/229.26 |
| 3,696,920 | A | * | 10/1972 | Lahay | A61B 50/20 128/DIG. 26 |
| 3,983,602 | A | * | 10/1976 | Barry | A42B 3/04 224/181 |
| 6,405,414 | B1 | * | 6/2002 | Byrnes | A61M 25/00 24/339 |
| 6,581,314 | B2 | * | 6/2003 | Valiulis | A47F 5/0869 40/642.01 |
| D648,211 | S | * | 11/2011 | Weaver | D8/396 |
| D657,460 | S | * | 4/2012 | Uhlenkamp | D24/128 |
| D749,209 | S | * | 2/2016 | Uhlenkamp | D24/128 |
| 2004/0118982 | A1 | * | 6/2004 | Shillings | F16L 3/223 248/68.1 |
| 2005/0234405 | A1 | * | 10/2005 | Dikennan | A61M 5/1418 604/180 |
| 2014/0208625 | A1 | * | 7/2014 | Kirby | G09F 3/16 40/658 |

\* cited by examiner

*Primary Examiner* — Robert Sandy
*Assistant Examiner* — Rowland Do
(74) *Attorney, Agent, or Firm* — Durham Jones & Pinegar, P.C., Intellectual Property Law Group

(57) ABSTRACT

A retention clip includes a base with a plurality of instrument engagement elements at a top of the base. A bottom of the base is configured to be secured to another object. The retention clip may have a size that enables it to be secured to and that enables it to secure other instruments to a portable object. As an example, the retention clip may be configured to secure a plurality of writing instruments to a hard hat, a tool box, a measuring tape or the like.

12 Claims, 2 Drawing Sheets

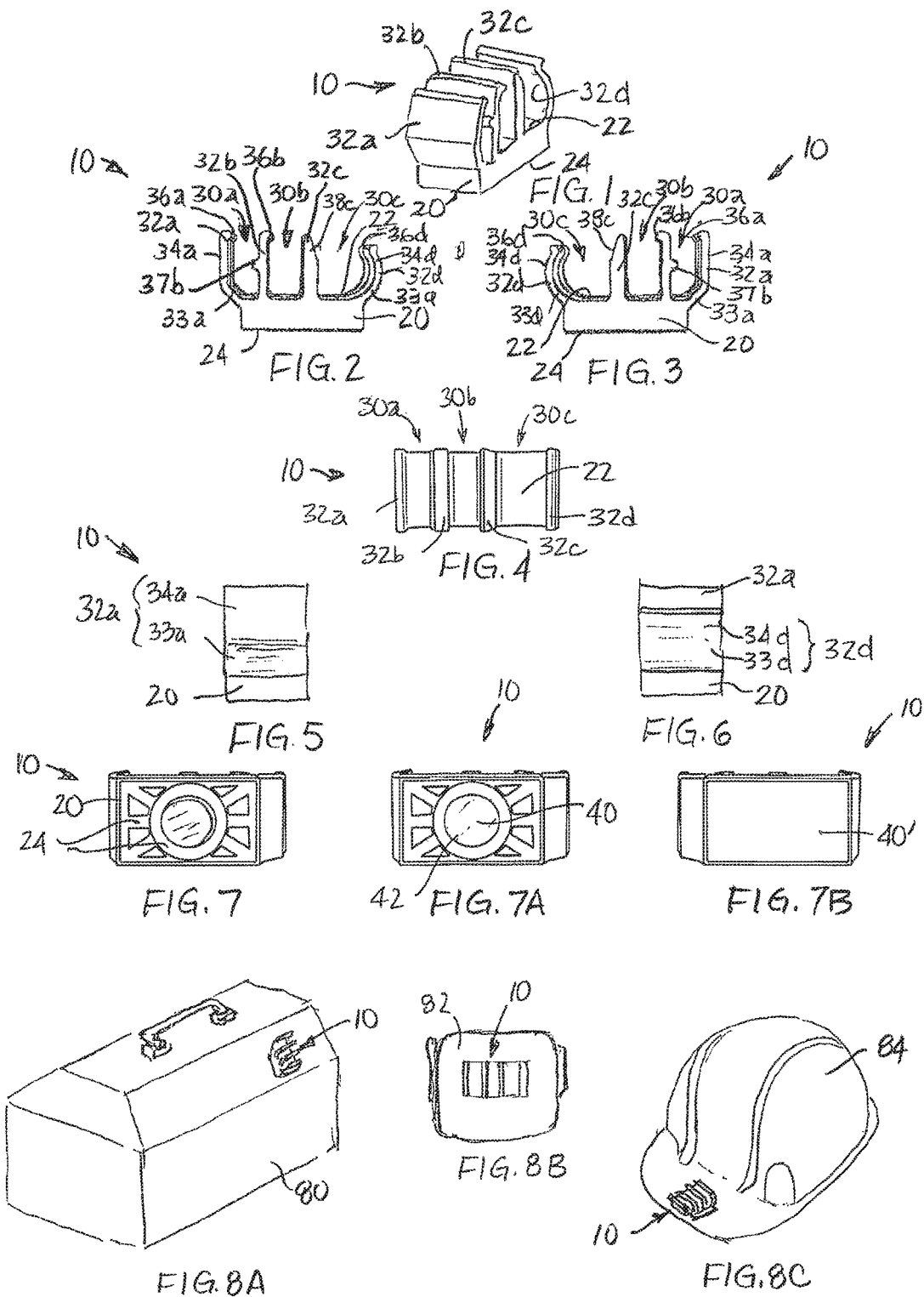

RETENTION CLIP FOR SECURING INSTRUMENTS OF DIFFERENT SIZES AND/OR CONFIGURATIONS TO OTHER OBJECTS

TECHNICAL FIELD

This disclosure relates generally to retention clips for organizing and retaining instruments, such as writing instruments and other office supplies, glasses and other small, portable objects, at locations where the retained instruments may be readily accessed. More specifically, this disclosure relates to retention clips that are configured to retain instruments of different sizes at readily accessible locations. In addition, this disclosure relates to methods for retaining instruments of different sizes at readily accessible locations.

BACKGROUND

Conventionally, individuals have carried writing instruments around by holding them in their hands, placing the writing instruments behind their ears, putting the writing instruments in their pockets or in a bag or another container, such as a brief case, a shoulder bag, a backpack, a purse, a tool box or the like.

When an individual carries a writing instrument in his or her hand, his or her hand is not free to perform other activities. While many individuals can deftly hold pens or pencils behind their ears, some cannot. Moreover, ears are typically not adapted to hold multiple writing instruments.

Placement of writing instruments in the pockets of shirts, jackets, coats or pants can be convenient, but occasionally results in pencil or ink marks on an individual's clothing. Writing instruments, when kept in pants pockets, can also tear holes into the pockets, puncture the individual keeping the writing instrument(s) in his or her pocket(s) and/or damage the writing instrument(s).

Storage of writing instruments in bags often limits their accessibility and consumes an individual's time. Typically, the bag must be opened and the writing instrument located before it can be withdrawn from the bag and used by the individual. Once the individual is done using the writing instrument, he or she must replace the writing instrument in the bag and close the bag.

SUMMARY

A retention clip according to this disclosure may be configured for placement on another object, such as a portable object, at a location where it and any instruments (e.g., writing instruments, tools, etc.) carried thereby are readily accessible. Such a retention clip may include a base with a top and a bottom. An attachment element may be located on or carried by a bottom of the base. The top of the base may include a plurality of instrument engagement elements.

The attachment element at the bottom of the base may be configured to secure the retention clip to another object. In some embodiments, the attachment element may be configured to removably secure the retention clip to another object. In a specific embodiment, the attachment element may comprise one or more magnets, which may removably secure the retention clip to an object that includes a ferromagnetic material. In other embodiments, the attachment element may be configured to temporarily secure the retention clip to an object. Examples of such an attachment element include, but are not limited to, adhesive elements, use of complementarily engaging materials (e.g., a hook element and a loop element, male and female snaps, etc.) and the like. As another option, the attachment element may permanently secure the retention clip to an object (e.g., a permanent adhesive material, etc.).

The instrument engagement elements at the top of the base may be configured to receive instruments of different thicknesses. Without limitation, the engagement elements may be configured to receive writing instruments of different thicknesses and with different cross-sectional shapes. In some embodiments, each engagement element may have an expandable element, enabling it to accommodate and retain instruments within a particular range of thicknesses. Adjacent instrument engagement elements may share at least one common element (e.g., a tab, etc.).

In use, a retention clip according to this disclosure may be secured to an object to make the instruments carried by the instrument engagement elements of the retention clip readily accessible from that object. A retention clip according to this disclosure may be secured to virtually any type of object, including, without limitation, stationary objects, movable objects, portable objects and wearable objects. In specific, but non-limiting embodiments, a retention clip according to this disclosure may be secured to an object typically associated with construction, such as the housing of a tape measure, a tool box, a hard hat or the like. A retention clip according to this disclosure may be secured to a surface within an automobile, such as on the dashboard, on a console or within a storage compartment of an automobile. In an office setting, a retention clip may be secured to a white board, to a filing cabinet, to a countertop (on top of the countertop, on an edge of the countertop, under the countertop), to a desk (on top of the desk, on an edge of the desk, under the desk), to a photocopier, to a printer, to a desktop computer, to an office phone or to any of a variety of other objects. A retention clip may be placed in similar locations when used in a school, as well as within the door of a locker. The retention clip may also be used at various locations throughout a house, such as on a refrigerator door, inside of a cabinet door, under a cabinet, under a countertop, on the wall of a garage or workshop or at any other suitable location.

In addition, a retention clip according to this disclosure may be secured to objects or items to which other instruments, such as writing instruments, tools or the like, are not ordinarily secured. Examples of such objects or items include electronic devices (e.g., photocopiers, printers, desktop computers, etc.), including portable electronic devices (e.g., tablet computers, smart phones, etc.).

The engagement elements of the retention clip may be configured to receive and retain a wide variety of different types of instruments. Included among the various types of instruments that may be held by a retention clip according to this disclosure are writing instruments (e.g., pens, pencils, carpenters pencils, markers, etc.), styluses, laser pointers, scissors, tools (e.g., screwdrivers, etc.), flashlights, glasses (e.g., eyeglasses, sunglasses, reading glasses, etc.), portable memory devices, keyrings, health, beauty and wellness items (e.g., lipstick, eyeliner, mascara, etc.), and other small, hand-held, hand-operated instruments.

Other aspects, as well as various features and advantages of various aspects, of the disclosed subject matter will become apparent to those of ordinary skill in the art through consideration of the ensuing description, the accompanying drawings and the appended claims.

BRIEF DESCRIPTION OF THE DRAWINGS

In the drawings:

FIG. 1 is a perspective view of an embodiment of a retention clip according to this disclosure;

FIG. 2 is a first side view of the embodiment of retention clip shown in FIG. 1;

FIG. 3 is a second side view of the embodiment of retention clip shown in FIG. 1;

FIG. 4 is a top view of the embodiment

FIG. 5 is a first end view of the embodiment of retention clip shown in FIG. 1;

FIG. 6 is a second end view of the embodiment of retention clip shown in FIG. 1;

FIG. 7 is a bottom view of the embodiment of retention clip shown in FIG. 1;

FIG. 7A illustrates an embodiment of an attachment element—a magnet—carried by a bottom of a base of the embodiment of retention clip shown in FIG. 6;

FIG. 7B depicts another embodiment of attachment element—an adhesive element—carried by the bottom of the base of the embodiment of retention clip shown in FIG. 6;

FIGS. 8A-8C illustrate various embodiments of objects to which a retention clip according to this disclosure may be secured.

DETAILED DESCRIPTION

Figure 9A:
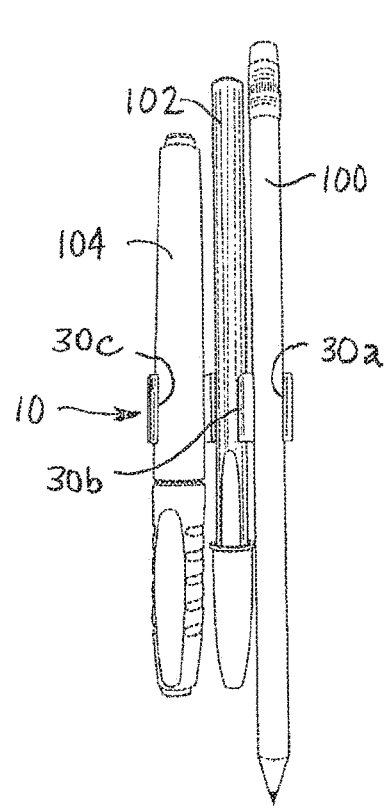
FIGS. 9A-9C show different embodiments of instruments that may be held by engagement elements of a retention clip according to this disclosure.

FIGS. 1-7B illustrate an embodiment of a retention clip 10. The retention clip 10 includes a base 20 with a top 22 and a bottom 24. A plurality of instrument engagement elements 30a, 30b, etc., on the top 22 of the base 20 are configured to receive and retain instruments of various dimensions (e.g., thicknesses, etc.) and cross-sectional shapes (e.g., round, polygonal, etc.). An attachment element 40 at the bottom 24 of the base 20 is configured to secure the retention clip 10 to another object.

In various embodiments, including that depicted by FIGS. 1-7B, the retention clip 10 may occupy a volume of about one cubic inch (about 16.4 cubic centimeters) or less. Such a size may render the retention clip 10 extremely portable, even wearable, and enable it to be secured to a wide variety of objects.

The embodiment of retention clip 10 illustrated by FIGS. 1-7B, as best seen in FIGS. 1-3, includes three instrument engagement elements 30a, 30b and 30c. Each instrument engagement element 30a, 30b, 30c is defined by a pair of spaced apart tabs 32a, 32b, etc. (which may be denoted generally herein as "tabs 32"), that protrude from the top 22 of the base 20. Centrally located tabs 32b, 32c, etc., may be shared by adjacent instrument engagement elements 30a and 30b, 30b and 30c, etc. More specifically, tabs 32a and 32b define instrument engagement element 30a, tabs 32b and 32c define instrument engagement element 30b and tabs 32c and 32d define instrument engagement element 30c. The tabs 32 may be oriented generally parallel to one another, or they may include portions that are generally parallel to each other, as can best be seen in FIGS. 2 and 3.

With continued reference to FIGS. 2 and 3, the distance between each adjacent pair of tabs 32a and 32b, 32b and 32c, 32c and 32d defines the minimum thickness of an instrument that may be engaged between that pair of tabs 32. At least one tab 32 of each adjacent pair of tabs 32a and 32b, 32b and 32c, 32c and 32d may flex relative to the top 22 of the base 20, enabling that tab 32 to give way to accommodate an instrument with a thickness that slightly exceeds a distance across an opening at the top of an instrument engagement element 30a, 30b, 30c and enabling that tab 32 to snap back into place to engage the instrument once it is placed between the adjacent tabs 32a and 32b, 32b and 32c, 32c and 32d of the instrument engagement element 30a, 30b, 30c. In some embodiments, each tab 32 may resiliently flex. The resilient flexibility of one or more of the tabs 32 of the retention clip 10 may enable each instrument engagement element 30a, 30b, etc., to receive and engage an instrument of a range of widths, with a lower limit of the range, or a minimum thickness, being a distance between the adjacent pair of tabs 32a and 32b, 32b and 32c, etc., defining that instrument engagement element 30a, 30b, etc., and an upper limit of the range, or a maximum thickness, being defined by extent to which one or both of the adjacent pair of tabs 32a and 32b, 32b and 32c, etc., may flex outwardly relative to the space between them. Such flexibility may be a function of the material from which the tab 32 is formed, the thickness of the tab 32 and/or the shape of the tab 32.

The spacing between each adjacent pair of tabs 32 may differ from the spacing between at least one other adjacent pair of tabs 32. In the illustrated embodiment, tab 32a and tab 32b are spaced a first distance apart from one another, tabs 32b and 32c are spaced a second distance apart from one another, and tabs 32c and 32d are spaced a third distance apart from one another. At least two of these distances may be different from one another, enabling at least one of the instrument engagement elements 30a, 30b, 30c to accommodate instruments of a first range of thicknesses and enabling another of the engagement elements 30a, 30b, 30c to accommodate instruments of a second range of thicknesses. In the illustrated embodiment of retention clip 10, the first distance between tabs 32a and 32b is smaller than the second distance between tab 32b and 32c, and the second distance is smaller than the third distance between tabs 32c and 32d.

The tabs 32 may also be configured to retain instruments regardless of the orientations of the retention clip 10 (e.g., vertical, horizontal, etc.) and the surface to which the retention clip 10 is secured (e.g., vertical, oblique, horizontal, top, bottom, etc.). A variety of different features to enable the tabs 32a, 32b, 32c, etc., and the instrument engagement elements 30a, 30b, etc., of which they are a part to accommodate different sizes, shapes and/or types of instruments.

Still referring to FIGS. 1-3, the tabs 32 may have different thicknesses. As indicated previously herein, the different thicknesses of the tabs 32 may impart them with different flexibilities, which may enable the instrument engagement elements 30a, 30b, etc., that are at least partially defined thereby to accommodate certain types, sizes or shapes of instruments. In the illustrated embodiment, the thicknesses of tabs 32a and 32b are about the same, while tab 32c is thicker than tabs 32a and 32b and tab 32d is thinner than tabs 32a and 32b (and, of course, than tab 32c).

Optionally, as shown in each of FIGS. 1-6, a tab 32a, 32d may include a base portion 33a, 33d, respectively, that protrudes orthogonally from the top 22 of the base 20 of the retention clip 10 and an upper portion 34a, 34d, respectively, that extends generally upward, substantially perpendicular to or perpendicular to the top 22 of the base 20. The orthogonally oriented base portion 33a, 33d of the tab 32a, 32d and/or the bend in the tab 32a, 32d (e.g., between its base portion 33a, 33d and its upper portion 34a, 34d, etc.) may impart it with increased flexibility over a generally planar tab 32b, 32c.

As another option, one or more tabs 32a, 32b, 32d may include a lip 36a, 36b, 36d at an upper extent thereof. A lip 36a, 36b, 36d protrudes over a portion of the space between adjacent tabs 32a and 32b, 32b and 32c, 32c and 32d. In some embodiments, lip 36a, 36b, 36d may be configured to retain an instrument that has been placed within that space and, thus, engaged by an instrument engagement element 30a, 30b, 30c at least partially defined by the tab 32a, 32b, 32d of which the lip 36a, 36b, 36d is a part.

One or more tabs 32b may include a ridge 37b. The ridge 37b may extend laterally across a width of the tab 32b, at a location part of the way up the height of that tab 32b (e.g., centrally along a height of the at least one tab 32b, at a higher elevation along the tab 32b, at a lower elevation along the tab, etc.). The ridge 37b protrudes toward an adjacent tab 32a, into the space of an instrument engagement element 30a defined by the tab 32b of which the ridge 37b is a part and the tab 32a towards which the ridge 37b protrudes. The ridge 37b may subdivide an instrument engagement element 32a of which it is a part into adjacent sub-elements 32a-1 and 32a-2, enabling the instrument engagement element 32a to accommodate a plurality of instruments. The ridge 37b may be configured to engage a portion of an instrument (e.g., a groove or recess in the instrument, a compressible portion of an instrument, etc.) in a manner that assists its retention between tabs 32a and 32b and, thus, its engagement by the instrument engagement element 32a.

In the illustrated embodiment of retention clip 10, at least one tab 32c includes a thin, tapered tip 38c, which may facilitate the introduction of an instrument into the instrument engagement element 30a at least partially defined by that tab 32c. Another tab 32d may have a convex shape. When used together, the tapered tip 38c of tab 32c and the convex shape of tab 32d, along with the flexibility of tab 32d, which may come from its relative thinness and/or its shape, may enable the instrument engagement element 30c defined by tabs 32c and 32d to receive relatively thick instruments. Alternatively, the convex shape of tab 32d may enable that tab 32d to receive and retain a loop from which an instrument may hang when the retention clip 10 is oriented vertically, with the tab 32d oriented horizontally and located at the bottom of the retention clip 32d.

Turning now to FIGS. 7-7B, the bottom 24 of the base 20 of a retention clip 10 according to this disclosure carries an attachment element 40, 40' which is configured to secure the retention clip 10 to another object. While the retention clip 10 may include any of a variety of embodiments of attachment elements, FIGS. 7A and 7B depict two specific embodiments of attachment elements 40 and 40', respectively.

The attachment element 40 shown in FIG. 7A comprises a magnet. Accordingly, the attachment element 40 may be used to removably secure the retention clip 10 to an object that includes a ferromagnetic material (e.g., iron, nickel, cobalt, etc., and alloys thereof). Without limitation, and as shown in FIG. 8A, the attachment element 40 may be used to secure the retention clip 10 to a tool box 80 or to any other suitable surface (e.g., to a refrigerator door, to a metal filing cabinet, to the inside of a metal locker, to a white board, to a metal feature on the exterior of a tape measure, etc.).

The attachment element 40 may be at least partially recessed within the bottom 24 of the base 20 of the retention clip 10, but protrude a sufficient distance from the bottom 24 to enable a bottom surface 42 of the attachment element 40 to contact a surface of an object to which the retention clip 10 is to be secured.

FIG. 7B illustrates an attachment element 40' that comprises an adhesive element. The adhesive of the attachment element 40' may comprise residue-free, readily releasable adhesive material, a pressure-sensitive adhesive material, a permanent adhesive material (e.g., a curable polymer, etc.) or the like. The adhesive material of the adhesive element of the attachment element 40' may be selected based on a material of a surface of an object to which the retention clip 10 is to be secured, based on the duration of time the retention clip 10 is expected to be secured to the object, based on the weights of the instruments that are to be carried by the retention clip 10, or based on any other factor that relates to the manner in which the retention clip 10 is to be secured to another object. As shown, the attachment element 40' may completely cover or substantially cover the bottom 24 of the base 20 of the retention clip 10. Alternatively, one or more smaller adhesive elements may cover one or more corresponding portions of the bottom 24 of the base 20.

An adhesive attachment element 40' may be used to secure a retention clip 10 to any of a variety of objects. Without limitation, an adhesive attachment element 40' may be used to secure a retention clip 10 to the housing of a tape measure 82, as depicted by FIG. 8B. As illustrated by FIG. 8C, the attachment element 40' may secure the retention clip 10 to a hard hat 84. Other objects to which the retention clip 10 may be secured by the attachment element 40' include, but are not limited to, a surface within an automobile (e.g., on a dashboard, on a console, within a storage compartment, etc.), a surface within an office (e.g., to a countertop, inside of a cabinet door, to a shelf, etc.), within a school, within a house (e.g., to a countertop, inside of a cabinet door, on the wall of a garage or workshop, etc.) or at any other suitable location.

A variety of other types of attachment elements may also be used with a retention clip 10 according to this disclosure. As an example, an attachment element may comprise complementarily engaging materials (e.g., a hook element and a loop element, male and female snaps, etc.), one member of which is secured to a retention clip, while the other member of the attachment element is secured to a surface to which the retention clip 10 is to be secured.

Figure 9B:
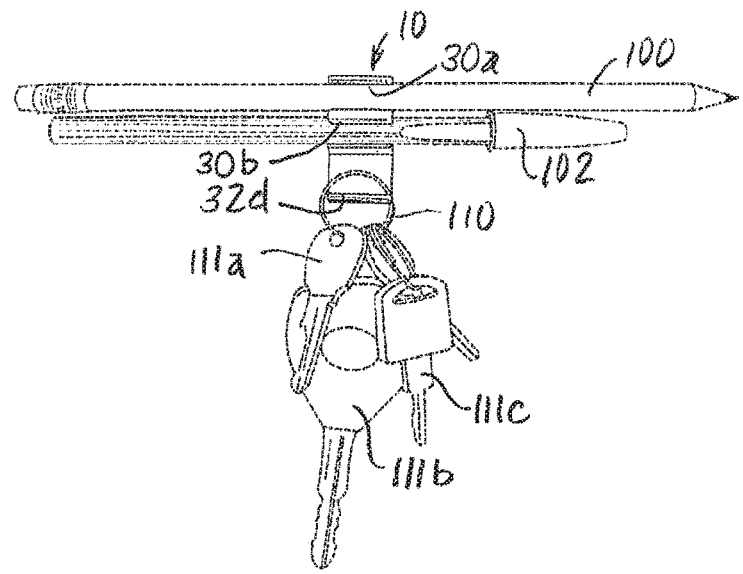
Figure 9C:
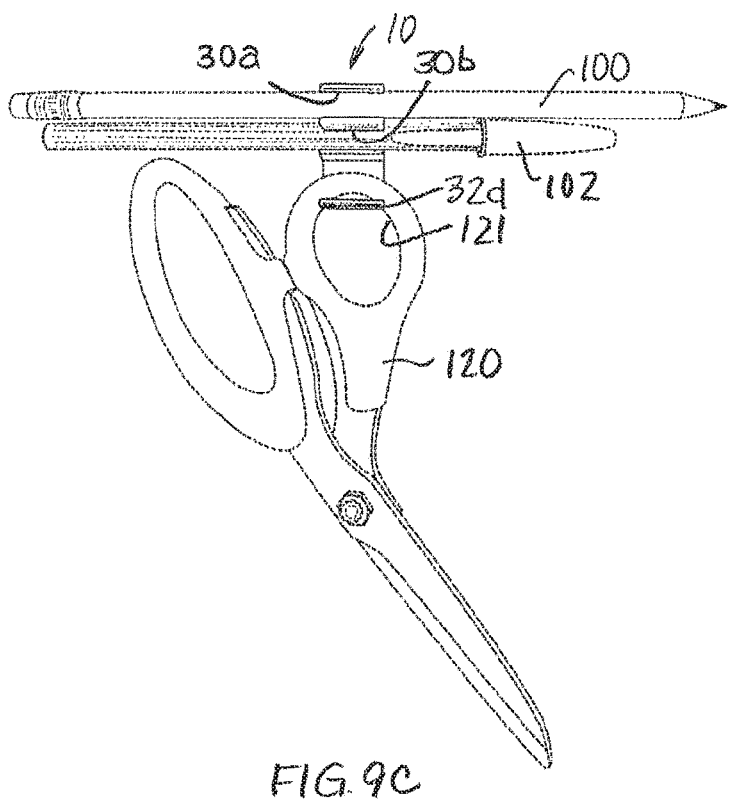

Referring now to FIGS. 9A-9C, various uses and orientations of retention clips 10 are depicted, with the retention clips 10 carrying a variety of different types of instruments. FIG. 9A illustrates the use of a retention clip 10 to retain writing instruments 100 (e.g., a wooden pencil, etc.), 102 (e.g., a ball point pen, etc.) and 104 (e.g., a marker, etc.) of different thicknesses (e.g., diameters, etc.), shapes and/or types, making them easy to find and readily accessible at the location where the retention clip 10 has been placed. More specifically, the writing instrument 100 with the smallest thickness is received and engaged by the narrowest instrument engagement element 30a, while instrument engagement element 30b receives a slightly thicker writing instrument 102 and instrument engagement element 30c receives an even thicker writing instrument 104.

FIG. 9B shows a retention clip 10 that has been oriented vertically on a vertical surface, such as a wall, a door or the side of a cabinet. In this orientation, a concavely shaped tab 32d (FIGS. 1-3, 5 and 6) may be used to retain a key ring 110 and keys 111a, 111b, 111c, etc., carried by the key ring 100 as the key ring 100 is hung on the tab 32d. In addition, instrument engagement elements 30a and 30b may be used to receive and retain writing instruments 100 (e.g., a wooden pencil, etc.) and 102 (e.g., a ballpoint pen, etc.), respectively of different thicknesses (e.g., diameters, etc.), shapes and/or types.

In FIG. 9C, the retention clip 10 is oriented in the same manner as the orientation depicted by FIG. 9B. Instead of holding a keyring 110 and keys 111*a*, 111*b*, etc., however, the concavely shaped tab 32*d* receives and holds a handle 121 of a scissors 120 in a manner that enables the scissors 120 to hang and to be readily removed from the tab 32*d* and, thus, from the retention clip 10.

Although the foregoing disclosure sets forth many specifics, these should not be construed as limiting the scope of any of the claims, but merely as providing illustrations of some embodiments and variations of elements and/or features of the disclosed subject matter. Other embodiments of the disclosed subject matter may be devised which do not depart from the spirit or scope of any of the claims. Features from different embodiments may be employed in combination. Accordingly, the scope of each claim is limited only by its plain language and the legal equivalents thereto.

What is claimed:

1. A portable clip, comprising:
   a base including a top and a bottom;
   an attachment element at the bottom of the base, the attachment element capable of securing the base to a carrying object; and
   a plurality of instrument engagement elements protruding from the top of the base, the plurality of instrument engagement elements including:
      a first instrument engagement element defined by a pair of spaced apart tabs with spaced apart tips, the pair of spaced apart tabs defining a first minimum width for receiving and engaging a first instrument including at least a portion having a first range of widths, including a minimum limit of the first minimum width and a maximum limit of a first maximum width, the first maximum width exceeding the first minimum width, opposite ends of the first instrument engagement element being open to enable the first instrument engagement element to receive an intermediate portion of the first instrument; and
      a second instrument engagement element defined by a pair of spaced apart tabs with spaced apart tips, the pair of spaced apart tabs defining a second minimum width for receiving and engaging a second instrument including at least a portion having a second range of widths, including a minimum limit of the second minimum width and a maximum limit of a second maximum width, the second maximum width exceeding the second minimum width, opposite ends of the second instrument engagement element being open to enable the second instrument engagement element to receive an intermediate portion of the second instrument,
      at least one pair of spaced apart tabs of an instrument engagement element includes a pair of spaced apart, substantially parallel tabs protruding from the top of the base,
      at least one tab of the pair of spaced apart, substantially parallel tabs includes at least one lip located at or near a top of the at least one tab and protruding laterally into a space between the at least one tab and another tab of the instrument engagement element, toward a flat surface of the another tab,
      the second minimum width exceeding the first minimum width,
      the first instrument engagement element and the second instrument engagement element sharing at least one common element.

2. The portable clip of claim 1, wherein the attachment element comprises a magnet.

3. The portable clip of claim 1, wherein the attachment element comprises an adhesive element.

4. The portable clip of claim 1, wherein the attachment element comprises complementarily engaging materials.

5. The portable clip of claim 1, wherein each instrument engagement element of the plurality of instrument engagement elements is defined by a pair of spaced apart, substantially parallel tabs protruding from the top surface of the base.

6. The portable clip of claim 5, wherein adjacent instrument engagement elements of the plurality of instrument engagement elements share a common tab.

7. The portable clip of claim 1, wherein at least one tab of the pair of spaced apart, substantially parallel tabs has a concave surface relative to a space between the at least one tab and another tab of the instrument engagement element.

8. The portable clip of claim 1, wherein at least one tab of the pair of spaced apart substantially parallel tabs includes at least one ridge protruding centrally along a height of the at least one tab and extending across a width of the tab, substantially parallel to the top of the base.

9. The portable clip of claim 1, wherein an outermost tab of a plurality of tabs includes a base portion that extends orthogonally from the top of the base and an upper portion that extends in a direction substantially parallel to an adjacent tab of the plurality of tabs.

10. The portable clip of claim 1, wherein the plurality of instrument engagement elements further includes:
    a third instrument engagement element with having a third minimum width for engaging a third instrument, opposite ends of the third instrument engagement element being open.

11. The portable clip of claim 10, wherein the third instrument engagement element has a third minimum width for engaging a third instrument including at least a portion having a third range of widths, including a minimum limit of the third minimum width and a maximum limit of a third maximum width.

12. The portable clip of claim 11, wherein the third maximum width exceeds the third minimum width.

* * * * *